United States Patent [19]
Grandmougin

[11] Patent Number: 4,949,171
[45] Date of Patent: Aug. 14, 1990

[54] COMMUTATION GRID

[75] Inventor: Gérard Grandmougin, Strasbourg, France

[73] Assignee: Visicable+, Paris, France

[21] Appl. No.: 275,387

[22] Filed: Nov. 23, 1988

[30] Foreign Application Priority Data

Nov. 24, 1987 [FR] France .................................. 8716272

[51] Int. Cl.$^5$ .............................................. H04N 7/18
[52] U.S. Cl. ................................... 358/93; 340/825.7; 361/416; 307/112
[58] Field of Search ...................... 340/825.7; 361/416; 307/112, 113, 115, 147; 358/93, 181

[56] References Cited

U.S. PATENT DOCUMENTS

| | | | |
|---|---|---|---|
| 4,400,627 | 8/1983 | Zola | 307/115 |
| 4,472,765 | 9/1984 | Hughes | 361/416 |
| 4,814,883 | 3/1989 | Perine et al. | 358/181 |

Primary Examiner—John K. Peng
Attorney, Agent, or Firm—Oblon, Spivak, McClelland, Maier & Neustadt

[57] ABSTRACT

A commutation grid in which any of N input signals can be output to any of M outputs. The input signals are fed to an input card which passes the input signals to an output card via a commutation card. These card elements are supported in a rack system which allows each card to make an appropriate contact with any other card. A user is also permitted to issue a command order which controls the operation of the communication card.

17 Claims, 7 Drawing Sheets

COMMUTATION GRID

The present invention relates to a commutation grid intended for the distribution at will of a signal on M outputs, notably a video signal, selected amongst N signals applied to as many inputs on the grid, whereby each of the M outputs can be commuted at will with any one of the N inputs as a function of an appropriate telecontrol signal.

It is known that the distribution systems or networks of video signals are considerably developing at present, by using cables or optic fibers, such as those disclosed in EP-A-0 118 161 or FR-A-2 285 758, which allow providing to a group of distinct users the images of multiple programs arising from simultaneous or preregistered transmissions distributed on the network. These images are intended to be received according to a choice of some sort by the users, who can at will select those images which they wish to receive on their receiving apparatus, which can be a TV set, a tape recorder, a monitor or other device, according to each individual case. Likewise, for the distributor of these images, it may be necessary to control and/or check their transfer for, for example, levying a right or toll on some programs, controlling the duration of reception of the transmission in view of an automatic charge or invoicing, putting in service or stopping these programs from a centralized control... More generally, it may also be advantageous to have a system which is partly interactive, allowing in a certain measure a possible conversation or dialogue between the users for, for example, carrying out public opinion polls, measuring the audience rating, directing product buys or orders through the television set, etc...

Likewise, it is conceivable that such distribution networks with a commutation grid of the hereabove type present a particular interest in the field of collectivities equipment such as for groups of buildings, hotels, hospitals..., where it is thus possible for each user to receive the images chosen amongst a large number of programs, with a considerable diversity, by receiving of course not only these images, but also the sound, in monophony as well as in stereophony, and even only the sound incoming from other sources and purely auditive (especially broadcast programs).

According to EP-A-0 152 173 in particular, commutation grids have already been considered which are in the form of a matrix with interconnected lines and columns, allow establishing at will a connection between N inputs and M outputs of the matrix, thereby providing the transmission of any selected signal to a user, also predetermined. However the units presently available are generally very complex, costly and have a relatively complicated usage, their use and above all their installation in optimal efficiency conditions being difficult. Moreover, in the commutation systems disclosed in the hereabove patent, the commutation cards used receive only a single input signal, which is a high frequency signal.

On the other hand, there is known from patent application Ser. No PCT/FR 88/00046, corresponding to U.S. Pat. No. 07/243,029, which is incorporated herein by reference a method and a device for a simple and reliable transmission, particularly without degradation of the signal, of a video signal or other signal, incoming from any source (television set, tape recorder, camera, receiver of TV transmissions or by satellite, even a computer monitor, etc...) and applied to a receiver situated at a distance, via a twin-line lead made of two wires of a very small section, practically less than a millimiter and, consequently, which are very discrete, flexible, easy to lay and to conceal along its path without necessitating installation works of the type of those necessary if the video signal has to be transmitted by a coaxial cable. Thus, due to this method and from any source situated at a distance (which distance can reach 300 meters or more), any type of video signal can be transmitted in any stantard (PAL, SECAM, D2 MAC PAQUET ...), to an appropriate receiving set, the system being designed in such a manner that the controls of the source (ON, OFF, possibly a review motion, a still-frame pause, recording, setting of the sound, light or contrast levels,...) can be telecontrolled from the receiving set by the user himself, who uses, in reverse direction, the same twin-line lead which transmits the video signals for conveying the necessary telecontrol signals.

The object of the present invention is a commutation grid which meets the aforementioned requirements, notably by putting in practice the hereabove method for the transmission of the delivered signal, by allowing transmission on any output line, chosen amongst a given number of such lines, a video signal selected from a group of different signals arriving from a common network, which is simple, inexpensive, reliable and which can provide upon request and according to the user's wish the commutations he desires.

The commutation grid according to the present invention is, on the other hand, designed in such a manner as to avoid crosstalk between the video signals flowing through the connections of the grid, the signals being transmitted without distortion or attenuation in a frequency band which can range from a few tens of Hz to 30 MHz or more, the grid being finally on a compact and modulable structure, without limitation of the N number of inputs receiving the signals to be transmitted to the M number of outputs allocated to the users, and each receiving at will any one of the input signals.

According to the present invention, the commutation grid in consideration is characterized in that it includes a fixed support structure for an assembly of input cards each receiving signals, notably video signals, possibly video and/or audio signals, the number of which cards corresponds to a given sub-multiple of the total number of N signals to be transmitted;

- at least a sub-assembly of commutation cards, each of which is connected to an input card;

- and at least one sub-assembly of output cards, all connected to the assembly of commutation cards and each delivering to a user any signal selected amongst the received signals by each commutation card from the associated input card, the commutation cards including an assembly of input cells mounted in parallel, the number of which is equal to that of the sub-multiple defining the number of video signals to be transmitted and received by an input card and an assembly of output cells, their number being equal to that of the output cards, each input cell and each output cell being joined by a commutation cell, which lets pass a selected signal from the input to the output under the effect of a command order given by the user, flowing through the output card associated to said user, via a treatment card which is common to the assembly of commutation cards, said treatment card controlling a conversion stage of the received orders, the support structure including at least one rack containing a sub-assembly of parallel commutation cards and a sub-assembly of output cards, also parallel but disposed perpendicularly to the commutation cards, the contact point of the edges or ridges of each commutation card with the associated edge of the corresponding output card providing the connection between an output cell on the commutation card and a selection circuit provided on the output card thus united.

According to a particular feature of the present invention, the treatment card is parallel to the commutation cards and is in contact via an edge with the output cards.

Preferably, the selection circuit output is connected to a transmitting circuit for restoring on two distinct conductors the respective audio and video signals prior to the transmission of the latter on a twin-line lead conveying them to a remote appropriate receiver. Notably, the present commutation grid according to the invention advantageously puts in practice, as regards the transmitter, the receiver and the twin-line lead connecting them, the dispositions of the aforementioned patent application U.S. 07/243,029.

Also according to another feature of the present invention, each commutation card of a sub-assembly is joined to the output of an input card by an adapted coaxial cable each, the cables conveying a signal received by the input card toward each of the commutation cards of the corresponding sub-assembly, the adaptation of the cable being provided at its ends by the input cards and a terminal resistor, respectively.

Figure 1:
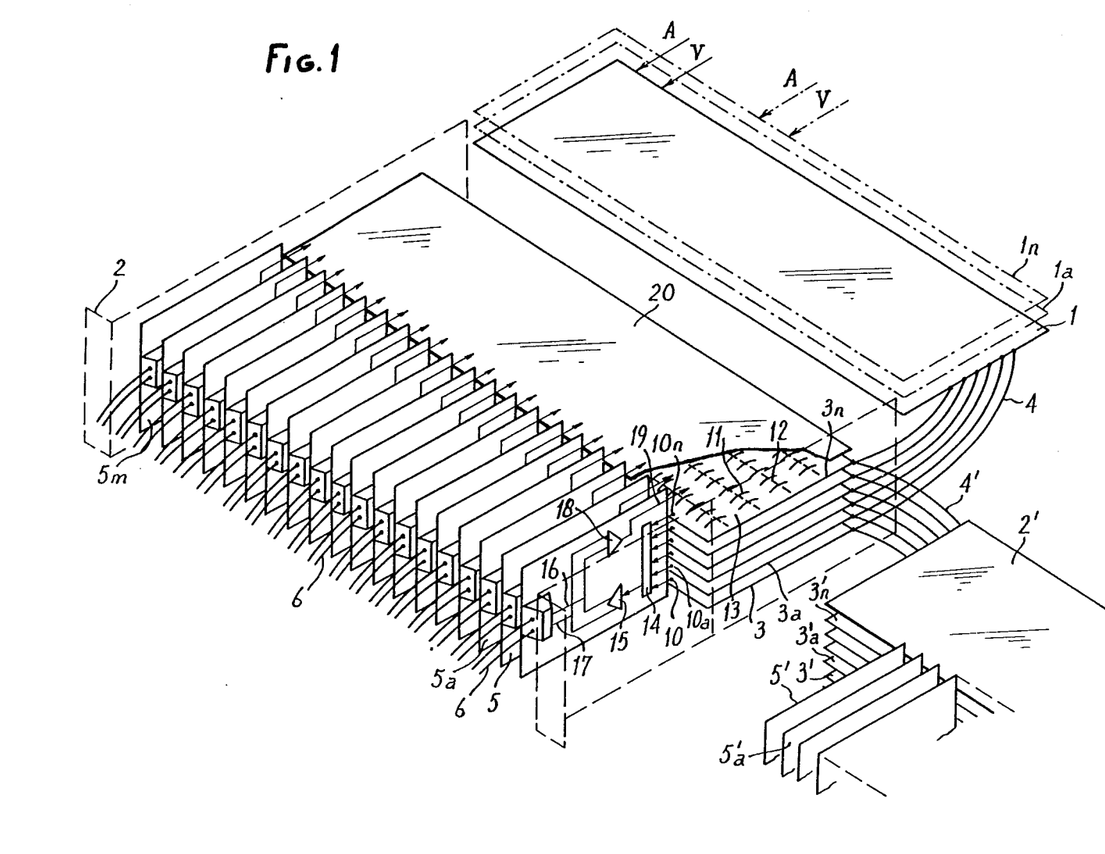
FIG. 1 is a partial perspective view illustrating the support structure of a portion of the various cards which are part of the grid according to the invention.

Other features of a commutation grid according to the present invention will become more apparent from the following description of the preferred embodiments given by way of non limiting examples, with reference to the accompanying drawings wherein:

FIG. 1 shows schematically the relative mounting in a fixed support structure of the various input, commutation, output and treatment cards, which are part of the commutation grid according to the present invention.

Thus, the system includes a first assembly of cards such as 1, 1a... 1n, called input cards, for video V and audio A signals for example, delivered to the inputs of the input cards 1 and incoming from an assembly of coaxial cables or from a beam of standard optic fibers (not shown). These respective audio and video signals are previsously treated, if necessary, in appropriate demodulation and adaptation stages (also not shown but well known in the technique), the video and audio signals are thus provided in a base band.

The signals thus applied to the input cards form therefore an assembly of n signals, which are distributed into distinct groups each forming a given sub-multiple of N, each group of signals being therefore allocated to an input card such as 1, 1a,...1n. It should be noted that these signals can be independent or more generally exploited at least two by two, particularly when a television image is to be transmitted, where the video signal is necessarily accompanied by an associated audio signal. Also, one can envisage that the same video signal is associated with two audio signals corresponding to a transmission of a stereophonic signal. On the contrary, one can also envisage that the input signal is only an audio signal, mono or stereo. The grid allows the transmission to the users of signals of any type, video or audio, or even others, the particular nature of these signals is in fact indifferent for particularly practicing the invention, except when there is envisaged a possible prior treatment of these signals in order to dispose them to an appropriate frequency band which is here between a few tens of a Hz and 30 MHz or more.

Each of the outputs of each input card 1, 1a,...1n is then connected inside a support rack 2 of the grid to the input of a commutation card amongst a sub-assembly of such cards, respectively 3, 3a,...3n. As regards the input cards 1 as well the commutation cards 3, reference n represents notably a given sub-multiple of number N, corresponding to the totality of the signals to be treated.

Thus and to make things clearer in a particular but non-limiting embodiment of the commutation grid in consideration, this grid is provided for treating at the input and from a network a number N of signals which is equal to forty-eight, each of them corresponding to a single audio signal or to a video signal combined with one and even with two associated audio signals, as hereabove indicated. The input cards 1, 1a,...1n are here provided for each treating each eight signals of the preceding type, which means that consequently the sub-multiple n corresponds in this example to six. In other words, six input cards 1 are available and for each sub-assembly six commutation cards 3, the latter being shown in FIG. 1, while only card 1 amongst the input cards 1 is shown in full lines, cards 1a...1n are shown in chain-dot lines.

The connection between any one of cards 1 and the commutation cards 3, 3a,...3n for each of the signals to be transmitted is provided by means of a coaxial cable 4, conveying the signal to be treated to an input stage E provided on the corresponding card 3 and the details of which will made clear later. Each cable 4 is impedance adapted at its two ends.

The commutation cards 3 are also connected to a sub-assembly of output cards 5, 5a,...5m, which collect any one of the signals treated in the grid and conveys it, via a twin-wire lead 6 of small section, to an appropriate receiver (not shown), the transmission and reception of the signal is carried out, at the input and the output of line 6, preferably according to the dispositions disclosed and claimed in the already cited application U.S. Pat. No. 07/243,029. Advantageously, the components mounted on each commutation card are placed in a zone situated in the prolongation of the associated output card.

The sub-assembly constituted by the output cards 5, 5a, ...5m associated with the commutation cards 3 in each element of rack 2 corresponds also to a sub-multiple, but here to the total number M of users of the grid. Thereby each of these cards 5 can select independently on a twin-line lead 6 allocated to it any input signal received by the grid and also transmit in the reverse direction by the same line 6 a telecontrol order causing the required commutation, that is the establishment of the necessary connection between the input line, receiving the selected signal and the output line corresponding to the user giving the aforementioned order.

Figure 2:
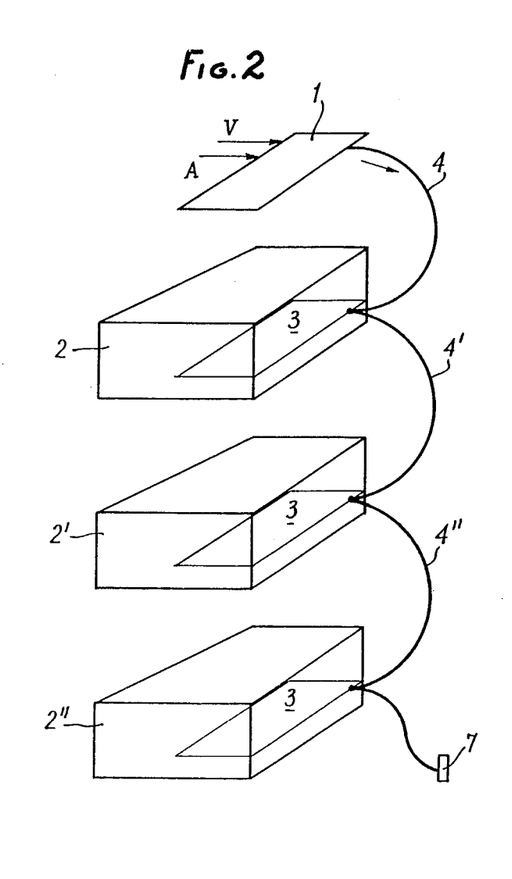
FIG. 2 is also a perspective view but more schematic showing the association in the support of several distinct racks connected in parallel by connecting coaxial cables with any one of the input cards.

In the example described by way of indication, the sub-multiple m corresponding to the output cards 5 is chosen to equal twenty, this corresponding to the mounting in rack 2 of twenty cards 5, therefore respectively designated 5, 5a,...5m;

However it should be noted that the commutation grid according to the present invention is of course not limited in its practical embodiment to the mounting of twenty output cards only, and that it could be provided with a higher number of such cards, without any particular limitation. In this embodiment however, rack 2 which contains the six commutation cards 3 and the twenty output cards 5, as shown in FIG. 1, is associated with a second rack 2' including in turn six commutation cards 3', 3'a...3'n and again twenty output cards respectively 5', 5'a,...5'm, and so forth. For example, in order to deliver the fourty-eight input signals to sixty output lines and to as many users, one will adopt three successive racks 2, 2', 2'' (FIG. 2), each including twenty output cards 5 and six commutation cards 3. The rack assembly thus formed is in turn associated with six input cards 1, each of which treats eight signals delivered by eight coaxial cables 4, successively to each rack of the assembly. In this case in fact and as shown schematically in FIG. 1, but as can be seen more clearly in FIG. 2, the coaxial cables 4 conveying the signals from the input cards 1 to the cards 3, 3a,...3n of each rack are connected from one rack to the other by prolongators 4', 4'' connecting in parallel the respective commutation cards, cables 4 and their respective prolongators 4', 4'' are impedance adapted at their two ends, on the one hand by the associated card 1 and on the other hand by an appropriate terminal resistor 7.

Figure 3:
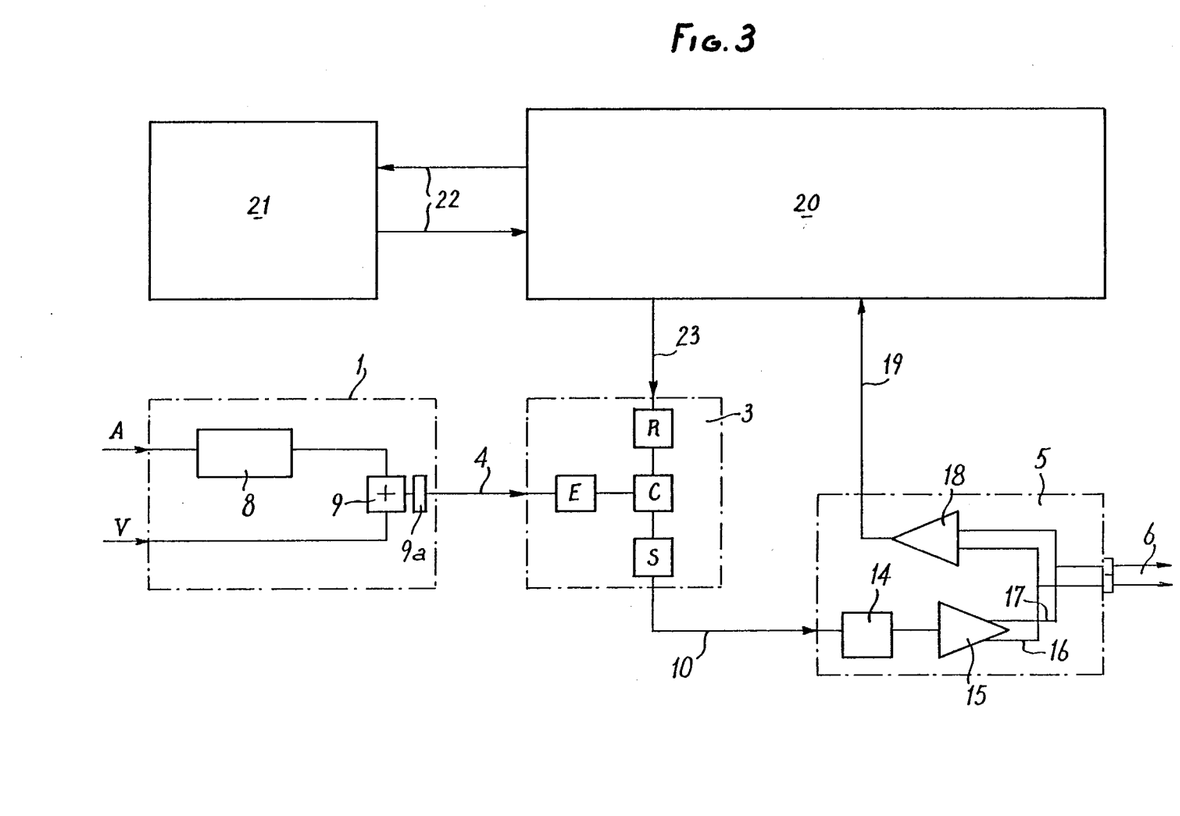
FIG. 3 is a systematic diagram of the electronic operation of the commutation grid for conveying signals from an input card to an output card on a transmlission twin-line lead.

FIG. 3 shows the diagram of the connection established between any input in a given input card 1, for example a video signal V associated here with an audio signal A, to an output card 5 and from the latter to a transmission line 6, via a commutation card 3.

In card 1, the audio signal A is previously modulated by a circuit 8 while the video signal V, superimposed, is brought to the card in the base. The two signals are therefore applied to an adder circuit 9, followed by an adaptator stage 9a prior to their transmission via cable 4 to any one of cards 3. Signals A and V in consideration are, in parallel, transmitted to the assembly of commutation cards 3 of rack 2, or of the racks in parallel 2', 2'', by as many cables 4, respectively 4', 4''. At the output of the commutation card 3 in consideration, the signal is transmitted to the output card 5 which, according to a particular feature of the grid according to present invention, is disposed in rack 2 (respectively 2' or 2'' according to case) in such a manner that its plane is perpendicular to that of the associated commutation card 3, as is shown in FIG. 1. This particular mounting of cards 3 and 5 allows obtaining an appreciable space gain in the rack, not only by associating directly to the six cards 3 of the example in consideration twenty cards 5, respectively parallel to each other in each of the corresponding sub-assemblies, but also by limiting to the single mutual point of contact of the edges or ridges of each of said cards the electrical connection necessary for the through flow of the signal from one card to the other.

In FIG. 3, the point of contact 10 is represented in the form of a conductor for facilitating the layout, but corresponds in fact to a direct punctual connection from one card to the other, as is shown in FIG. 1. Advantageously, and as is also shown in FIG. 1, each commutation card 3 includes on one of its faces a layout plan 11 on which are implanted components and connection straps 12, while the output conductors 13 and the corresponding weldings are constituted by the paths of a printed circuit extending on the other face of the card, preferably in a direction perpendicular to the straps 12. These dispositions allow notably reducing in a great measure the crosstalk effects between signals simultaneously received by cards 3, on the one hand, and forming a shield between the inputs and the outputs respectively, and on the other hand reducing ground current effects. In card 5, the signal received flows through a selection circuit 14, the details of which will be explained hereafter, followed by a transmitter stage 15 restoring on conductors 16 and 17 the audio A and video V signals, which are then collected on the twin-line lead 6 at the output of the card.

According to a particular feature of the present invention and in a preferred embodiment which nevertheless does not present any character of necessity as such, other equivalent dispositions can be considered. The transmitting circuit 15 corresponds to the transmitting assembly described and shown with reference notably to FIGS. 2 and 3 of the already cited patent application U.S. Pat. No. 07/243,029. Notably, such a circuit is provided, according to this cited application which, in this respect, is incorporated into the present description, for establishing the transmission on a twin-line lead conductor of a signal, particularly a video signal, by feeding the line with at least one current generator outputting symmetrically on the wires, while being voltage-controlled by the signal to be transmitted, the line being adapted at each of its ends by an impedance equal to its characteristic impedance. More particularly and still with reference to the above-cited application, circuit 15 includes two current generators disposed in series with two equal resistors, the median point of which is connected to the ground via a capacitor, the signals delivered feeding respectively line through the windings of symmetrical transformers, each mounted in series with one of the wires of the line.

On this same twin-line lead 6 are also conveyed in the reverse direction and according to an additionnal characteristic of the device described in the above-cited application telecontrol information necessary for the operation of the grid, the informationd being in the form of pulses emitted by the user to whom is allocated an output card 5. The pulses are sent back in the reverse direction to that of the received signals to a treatment circuit 18 supplying at 19 an appropriate pulse. The pulse is thus conveyed to the input of a complementary card 20, called a treatment card, mounted in rack 2 in a separate manner to that of the commutation cards 3, and preferably parallel to cards 3.

As is shown in FIG. 1, the point of contact 19 between the cards 5 and the treatment card 20 is provided in the same manner as point 10 for the commutation cards 3, by a punctual connection in contact with the perpendicular edges of cards, point of contact being shown in FIG. 3 in the form of a conductor in order to make FIG. 3 more clear. The treatment circuit 18 preferably also conforms to the already described disposition in the prior application U.S. Pat. No. 07/243,029 hereabove mentioned, and includes notably a differential stage, a pass-band filter and a demodulator followed possibly by an amplifier. The telecontrol signals thus treated are previously received by the twin-line lead 6 from an adequate source (infrared generator or other) controlling a current generator symmetrically operating and placed in parallel on the line with the receiver for the video and/or audio signals which are supplied.

Finally, in FIG. 3 is shown schematically the treatment card 20, which includes notably a circuit of the microprocessor type, which decodes the telecontrol information received by connections 19, and applies an appropriate control signal to cards 3, via conductors 23. In each of cards 3 are provided between each cable 4, applying a given signal to the card 3, and the output point 10 with card 5, an input cell E and an output cell S. These two cells are connected by a commutation cell C, opened or closed according to the control order received from the treatment card 20 via a conversion stage R associated therewith. A connection 22 connects cards 20 of the grid with an outer circuit 21, which permit the carrying out of complementary counting operations or the transmitting of prohibition signals under certain particular conditions of use.

Figure 4:
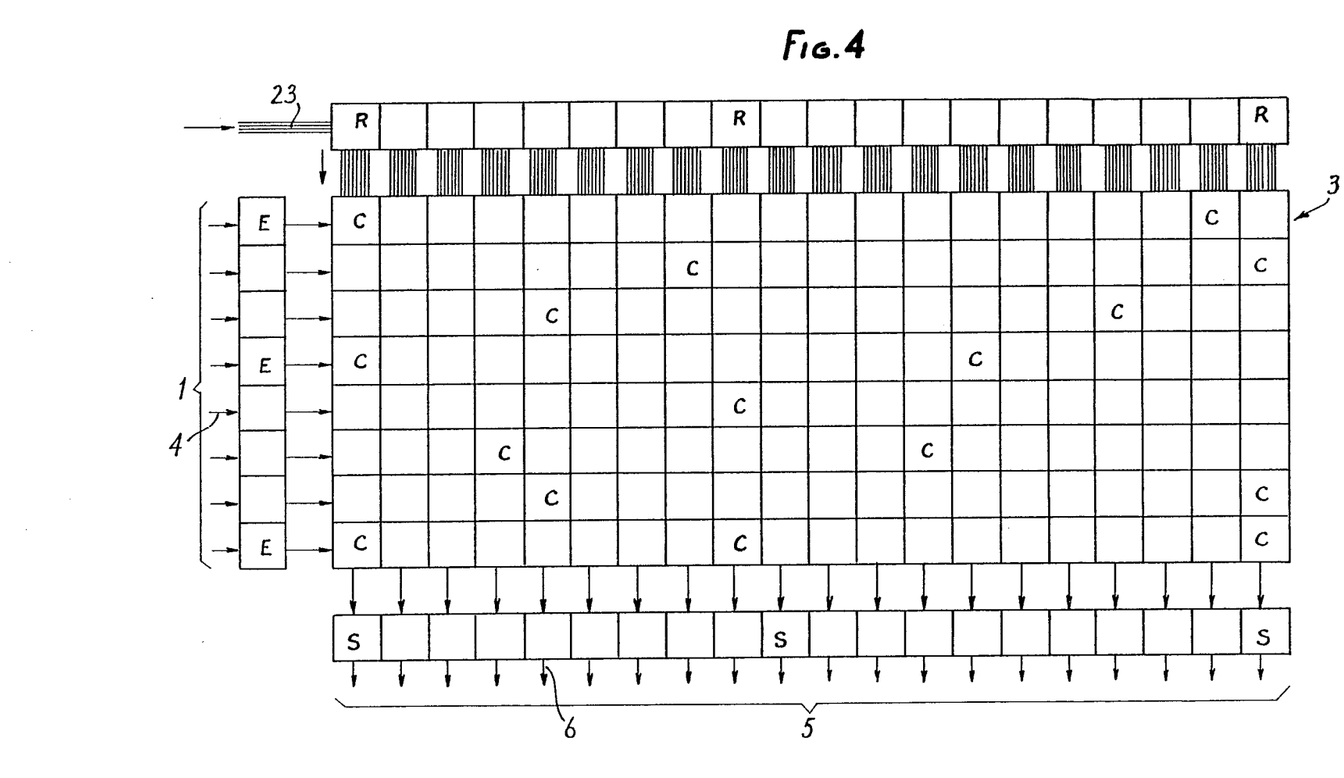
FIG. 4 is a systematic diagram of a portion of the matrix provided in the present commutation grid according to the invention.

FIG. 4 shows a diagram of a portion of the matrix provided in the grid by means of the assembly of cells E and S via the commutation cells C, the latter being connected in lines and in columns, respectively, to the input and output cells in the manner thus shown. As appears in this respect from the above description and from the explanation already given, cells E and S are, respectively, eight in number, and twenty in the example more particularly considered where each commutation card 3 receives in fact, from the same input card, eight distinct signals amongst fourty-eight possible signals, while the sub-assembly of the six commutation cards 3, each receiving these eight signals, is associated with twenty output cards 5. The diagram of FIG. 4 shows in fact only a portion of the total matrix, which actually includes a number of inputs which is six times greater (corresponding to the six input cards 1, 1a...1n) and a number of outputs which is three times greater (for an assumed total of sixty users) corresponding to the three racks in parallel 2, 2', 2".

As regards the conversion stages R, they are arranged in the example in consideration so as to provide a series-parallel conversion of the received signals and disposed according to the columns of the portion of matrix which is shown, each stage interesting thus the commutation cells C of a column, in each commutation card 3 of the same rack.

In the arrangement corresponding to the drawing, the mounting in parallel of six commutation cards and their connection at 10 with the selection circuit 14 of each of the output cards 5 is in fact the same as to divide the matrix in practice into eighteen distinct sub-assemblies (six times three) of which only one is shown in FIG. 4. Each column of the matrix is reserved to a user who, through card 5 and the circuit 18 of the card 5, sends to one of the three associated treatment cards 20 (one for each rack), the telecontrol orders, providing for the selection of the line corresponding to the chosen video signal and its restitution on the matrix column corresponding to the appropriate user. The system therefore allows controlling the grid by authorizing for each user a choice of any one of the signals amongst the fourty-eight signals which are available, without deteriorating or deforming the selected signal, the linearity performance and the frequency response of which remaining excellent and above all without any possibility of interference of one output line with another, each of the lines being entirely uncoupled with regards to those which are allocated to other users.

Figure 5:
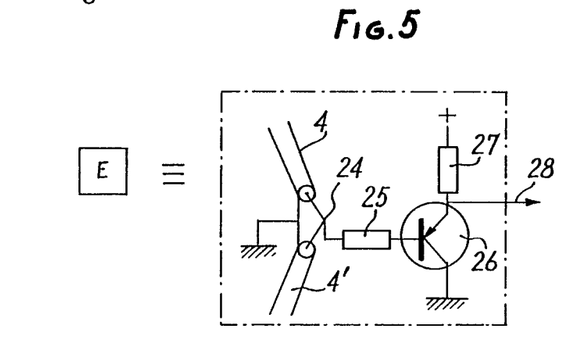
FIG. 5 is an electronic diagram of an input cell of the matrix of FIG. 4, in a particular embodiment.
Figure 6:
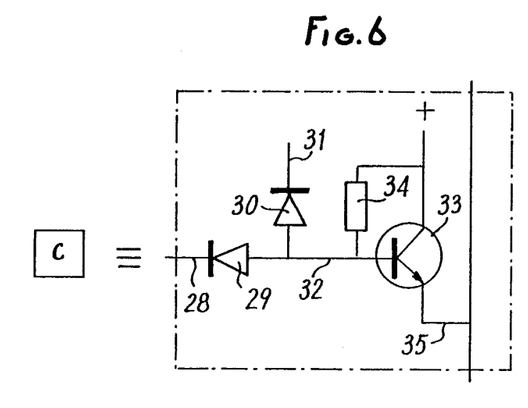
FIG. 6 is an electronic diagram of a commutation cell of the matrix, associated with the input cell of FIG. 5.
Figure 7:
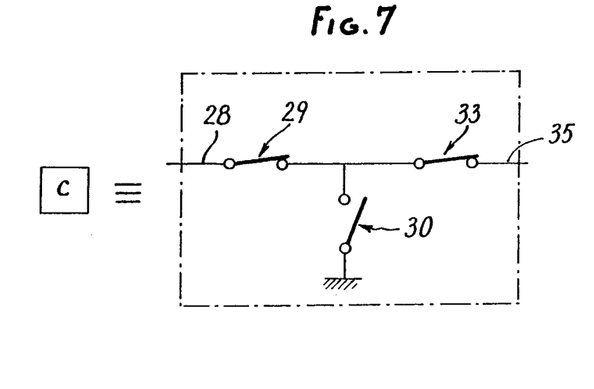
FIG. 7 is a simplified diagram for better understanding of the operation of the commutation cell of FIG. 6.
Figure 8:
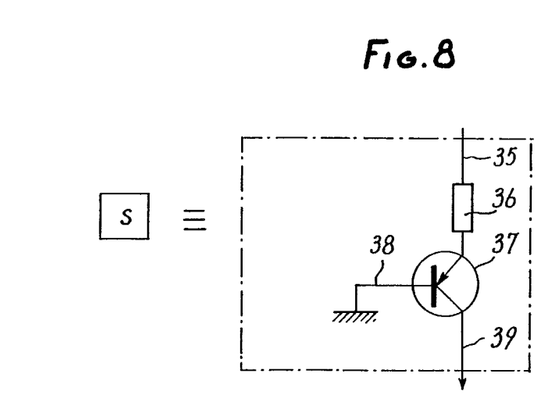
FIG. 8 is an electronic diagram of an output cell of the matrix according to FIG. 4.

FIGS. 5, 6 and 8 illustrate, in a first variant, the structure of cells E, C and S respectively, FIG. 7 facilitating the understanding of the operation of the commutation cells C according to FIG. 6.

illustrates one of the input cells E shown at connection point 24 of the coaxial cables 4 and 4' with one of the commutation cards 3, conveying to the card one of the signals received from the associated input card 1, a resistor 25 of small value connected to an output transistor 26 biased by a resistor 27 and supplying with a low impedance an output signal adapted for feeding in parallel and via a conductor 28 the assembly of commutation cells C situated on the one and same line of the portion of matrix of FIG. 4. The conductor 28 corresponds in FIG. 1 to the straps 12 which are shown here.

The signal thus collected at the input of any cell C does not flow normally through it, at least as long as the commutation order incoming from stage R and addressed to the concerned cell has not been received by the latter. To this effect, cell C, the diagram of which is shown in FIG. 6, receives the signal via lead 28, which flows or not through diode 29 according to whether the diode is inhibited or not as a function of the state of another diode 30 connected via a lead 31 to the conversion stage R of the telecontrol signals. If diode 29 is conductive, the signal received feeds via lead 32 a transistor 33 biased by a resistor 34 and outputting at 35 an amplified signal. The amplified signal is then applied to the output cell S (FIG. 8) via a resistor 36 and a transistor 37, the base of which is connected to ground.. via a lead 38. The output signal on the collector of the transistor 37 is then conveyed by a lead 39 to the output card 5 corresponding to the point of contact 10 of curd 5 with the commutation card 3.

FIG. 7 shows schematically the operation of the commutation cell C between input 28 and output 35. The diodes 29 and 30 and the transistor 33 are represented by switches with a synchronized control, in such manner that switches 29 and 33 are simultaneously opened when 30 is closed, and vice versa. In fact, whatever the quality of the components used, there remains in parallel on the terminals of the latter an interference capacity, through which can be established, in the opened position of switches 29 and 33, a leakage current, so that if switch 30 did not exist a residual signal would still be transmitted to the output lead 35, disturbing the operation of the system. On the contrary and due to switch 30, when 29 (and 33) are open, 30 closed, any possible leakage current through the interference capacity established on 29 is directed to ground, thus no signal is delivered to the output lead 35. It is therefore precisely on this principle that the circuit of FIG. 6 operates, with the advantages pertaining to it as regards the closing or opening, strictly "all or nothing", of the corresponding commutation cell.

Figure 9:
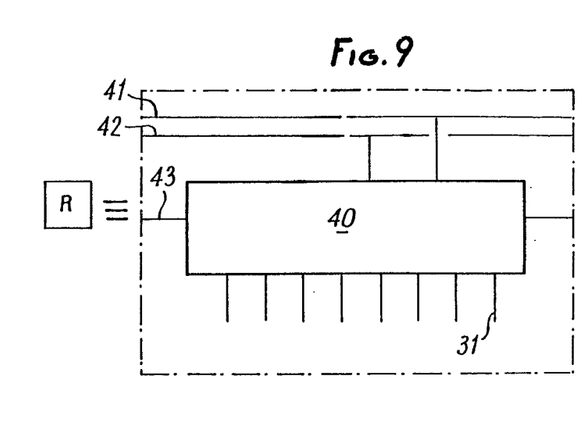
FIG. 9 is a diagram of the conversion stage of the control signals of the matrix commutation cells.

FIG. 9 shows the details, in the same embodiment, of the conversion stage R receiving from line 10 via the output card 5 associated therewith the control orders for the required commutation of any one of cells C of the corresponding column, at the level of the line of the matrix which receives the input signal to be transmitted.

The telecontrol signals are notably decoded in the treatment card 20 which they reach through lead 19 (FIG. 3) and are then treated by a microprocessor which, after selection of the address of the cell C to be commuted, sends to it the necessary order via lead 23. Each conversion stage R includes to this effect a shift register 40, to which are applied, respectively, by leads 41 and 42 the clock and loading signals, while a series signal is introduced at 43 so as to select the output of the corresponding register precisely at the address of the cell to be commuted. Due to the connection 22 and to circuit......21, one can simultaneously take in charge other information for, for example, for carrying out counting operations or establishing prohibitions, authorizing the commutation only under certain conditions and only for certain users.

Figure 10:
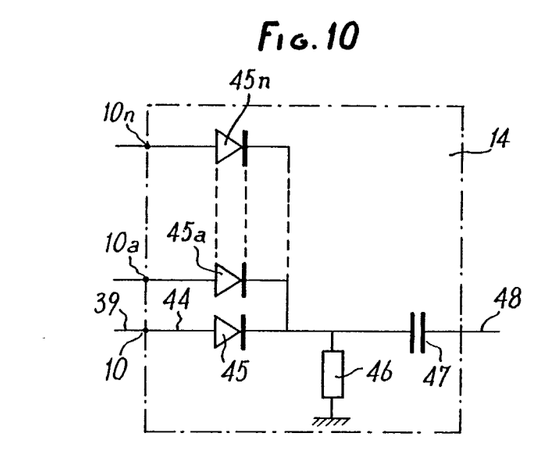
FIG. 10 is an electronic diagram of the input selection circuit of an output card.

Finally, FIG. 10 shows, also for the same embodiment, the particular structure of the selection circuit 14 provided on each output card 5 which allows transmitting to the transmitter circuit 15 the only signal received from the matrix via cells E, C and S according to the hereabove indicated process.

In this Figure, one sees again the output lead 39 of cell S which transfers from the commutation card 3 to the output card 5, at the point of contact 10 of the cards, the selected signal coming thus, according to case, from any one of cards 3, 3a,...3n and interesting any one of cards 5, 5a,...5m. Circuit 14 includes to this effect n diodes 45, 45a,...45n, mounted in such manner connected by a lead 44 to a corresponding point 10, to a common biasing resistor 46 and to a capacitor 47, for delivering the signal at the output of the circuit on lead 48 which sends it back to the input of transmitter 15.

Cells S (FIG. 6) form in fact in the example described the voltage-controlled current generators, this presenting the advantage of eliminating any disturbance possibility due to the resistance of the contact at point 10 of cards 3 and 5, and particularly by the series resistance represented by circuit 14, thereby eliminating the effects of the non linear characteristic of the diodes used. In this respect, one should note that if none of cells C of a column of the matrix is in service, no current will flow from the corresponding cell S, and this will shut didoes 45 in circuit 14. Due to the current generator constituted by this cell, a slight voltage difference between cards 5 and 3 is not added to the usual signal; therefore, there is no risk of crosstalk at the level of the output cards between the signals passing through them.

Figure 11:
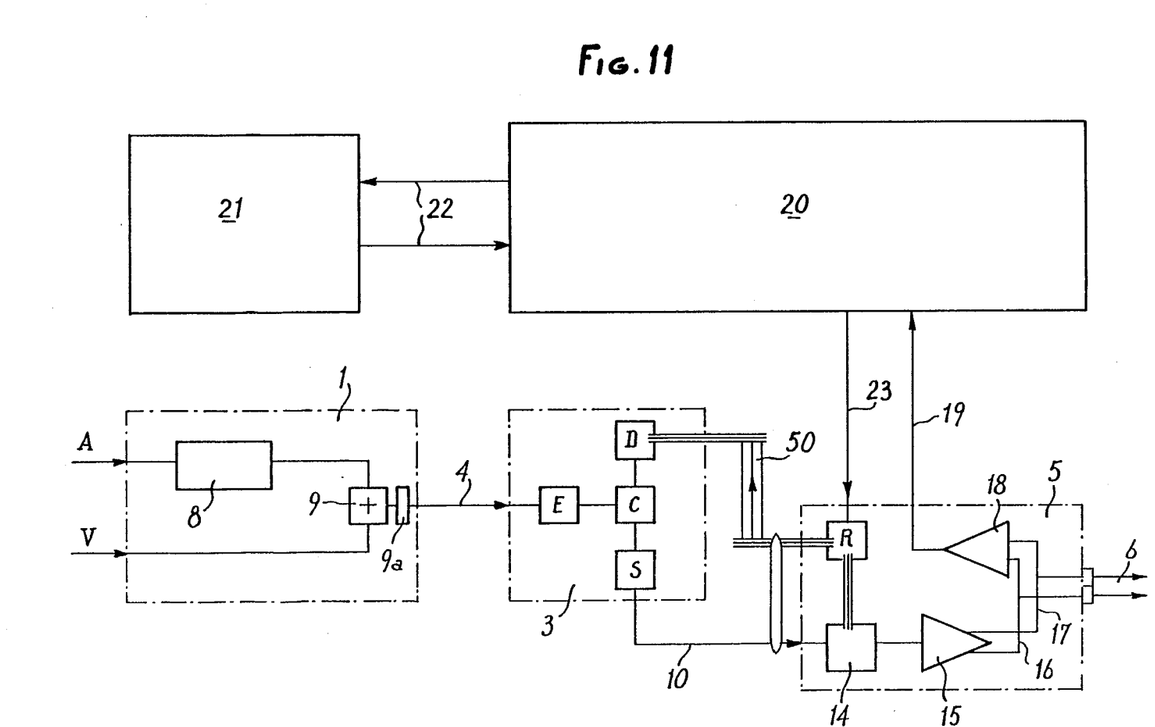
FIG. 11 is a view of an alternative embodiment of the electronic diagram of the commutation grid including several variants with respect to that shown in FIG. 3.

FIG. 11 shows an alternative embodiment to the electronic diagram shown in FIG. 3, showing how the transmission of signals from an input card 1 to an output card 5 and from the latter to the twin-line lead 6 is carried out. In FIG. 11 reference numerals identical to those used in FIG. 3 are used in order to designate the members playing the same roll and reaching the same result in both Figures.

Figure 12:
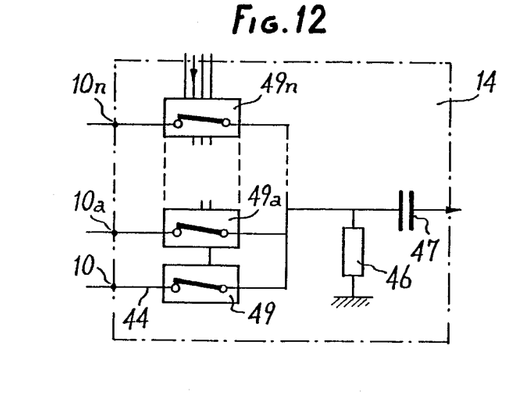
FIG. 12 is a systematic diagram of an alternative embodiment of the selection circuit of an output card.

Particularly, and as shown in FIG. 12, the diodes in parallel provided in the discriminator circuit 14 receiving on leads 14 from the points of contact 10 between the commutation cards and the output cards, are replaced here by switches 49, 49a,... 49n constituted by appropriate electronic micro-relays, for example, of the analog commutator type CMOS, whose control of the opening as well as of the closing is determined by an order incoming from the associated conversion stage R.

Figure 13:
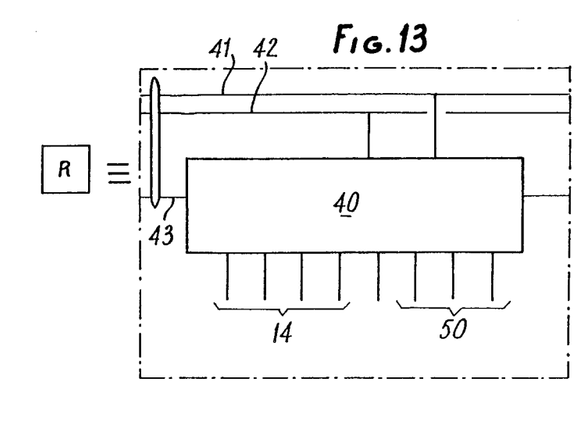
FIG. 13 is a diagram showing a variant of the conversion stage, adapted to the diagram according to FIG. 11.
Figure 14:
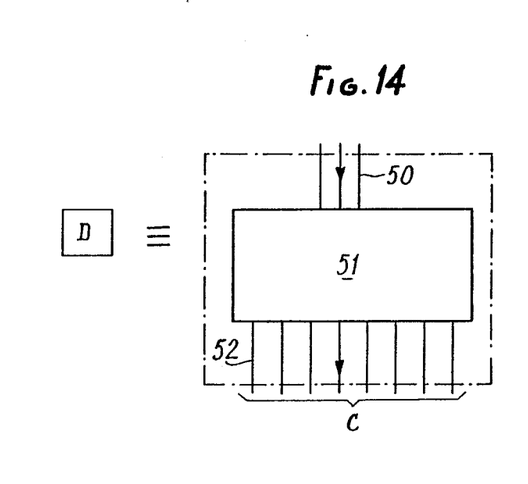
FIG. 14 shows a systematic diagram of a decoding circuit, also used in the same alternative embodiment.

In this variant however, the conversion stage R of the control signals providing for the commutation of cell C of card 3 is carried by the output card 5 and receives directly from the treatment card 20 the corresponding orders via lead 23. In this case, the conversion stage schematically shown in FIG. 13 includes once again a shift register 40 with an input lead 41 for a clock signal and an input lead 42 conveying loading signals of the register, the control signal selecting the address of cell C to be commuted in the register being conveyed by lead 43. The register delivers two series of signals, respectively, to the selection circuit 14 as in the previous variant, and to a decoder D, carried by the associated commutation card 3, the signal being transmitted to the decorder circuit by a lead 50. The decoder D schematically shown in FIG. 14 includes a treatment circuit 41 for the received signals 50 and as many outputs 52 as the matrix includes cells C, in order to cause, as a function of the order receiveD from a given user, the transmission of the selected signal. Decoder D plays therefore, at the level of that portion of the matrix, the role of conversion stage R in FIG. 4.

What is claimed is:

1. A commutation grid for the selective distribution of N input signals to any of M outputs, wherein one of said M outputs will be commuted to one of said N input signals based on a telecontrol signal, where N and M are integers greater than O, comprising:
   a fixed support structure for an assembly of input cards (1), each said input card receiving a plurality of input signals, the number of which correspond to a predetermined sub-multiple of the total number of input signals N;
   at least one sub-assembly of commutation cards (3), each of which is connected to an associated input card (1);
   at least one sub-assembly of output cards (5) connected to a sub-assembly of commutation cards (3) and each output card delivering to a user any of the N input signals received by each commutation card from the associated input card;
   said commutation cards (3) including an assembly of input cells (E) mounted in parallel, the number of which is equal to the number of a sub-multiple defining the number of signals to be transmitted and received by an input card (1), and an assembly of output cells (S), their number being equal to the number of output cards (5), each input cell and output cell being joined by a commutation cell (C), wherein said commutation cell allows a selective signal from an input cell to be sent to an output cell under the effect of a command order given by a user, which command order flows through the output card (5) associated with the user to a treatment card (20) which is common to the assembly of commutation cards (3) wherein said treatment card controls a conversion stage (R) of the received command order; and said support structure including at least one rack (2) containing a sub-assembly of parallel commutation cards (3) and a sub-assembly of parallel output cards (5) disposed perpendicular to the commutation cards, wherein a contact point (10) of an edge of each commutation card and an associated edge of an associated output card provides a connection between an output cell (S) of the commutation card (3) and a selection circuit on the associated output card (5).

2. A commutation grid according to claim 1, characterized in that the treatment card (20) for the telecontrol orders includes a microprocessor system sending series information to a shift register (40) for delivering a control signal to the associated commutation cell (C).

3. A commutation grid according to claim 1, characterized in that each output cell (S) constitutes a voltage controlled current generator, including a transistor (37) the base of which is connected to ground, which receives at its emitter the signal transmitted by a commutation card and delivers at its collector an output signal.

4. A commutation grid according to claim 1, characterized in that the conversion stage (R) is carried by the associated output card (5) and receives directly from the treatment card (20) the telecontrol signals, a series-parallel conversion stage sending back a signal to the corresponding commutation cell (C) via a decoder circuit.

5. A commutation grid according to claim 1, characterized in that the components mounted on each commutation card are disposed in a zone situated in a prolongation of the associated output card.

6. A commutation grid according to claim 1, wherein said input signals comprise audio and video signals.

7. A commutation grid according to claim 1, characterized in that each commutation card of a sub-assembly is connected to the output of an input card via an adapted coaxial cable (4), each cable conveying an input signal received by the input card to each of the commutation cards of the corresponding sub-assembly, the adaptation of the cable being provided at its ends by the input card (1) and by a terminal resistor (7), respectively.

8. A commutation grid according to claim 7, characterized in that, when the support structure includes several racks (2, 2', 2"), the coaxial cables (4, 4',...) are in series from one rack to the other.

9. A commutation grid according to claim 1, characterized in that the input cells (E) and the output cells (S) form a matrix, respectively with lines and columns, the crossing points of which each include a commutation cell (C), the conversion stages (R) controlling the commutation of cells (C) in columns for the transmission of a signal from one input cell (E) to an output cell (S).

10. A commutation grid according to claim 9, characterized in that each input cell (E) is a high impedance cell receiving the signal incoming from the associated input card (1), transmitted by the coaxial cable (4), said input cell supplying at a low impedance and in parallel the commutation cards (C) of one line of the matrix.

11. A commutation grid according to claim 9, wherein said columns of said matrix are formed of connection straps (12) on a first side of said commutation card and said lines of said matrix are formed of paths of a printed circuit on a second side of said commutation card, said second side being opposite said first side, and a plane placed between the connection straps and the paths is grounded, thereby reducing cross-talk between the input and output signals and reducing ground current effects.

12. A commutation grid according to claim 1, characterized in that the treatment card (20) is parallel to the commutation cards (3) and in contact with the output cards (5).

13. A commutation grid according to claim 12, characterized in that the output of the selection circuit (14) is connected to a transmitter circuit (15) supplying to a set of leads (16, 17) the input signals prior to the transmission of said signals on a twin-line lead (6) conveying them a distance to an appropriate receiver.

14. A commutation grid according to claim 13, characterized in that the twin-line lead (6) transmits, in the reverse direction of the input signals, telecontrol orders received by a treatment circuit (18) provided on the associated output card (5), delivering a control pulse applied to an input (19) of the treatment card (20), the latter being mounted in the same rack (2) as the commutation cards (3), but seperate from the latter.

15. A commutation grid according to claim 1, characterized in that each commutation card (3) includes two electronic switches (29, 33) mounted in series, a point between the two electronic switches connected to ground via a third switch (30), the first two switches being open when the third one is closed, and vice versa.

16. A commutation grid according to claim 15, characterized in that the first and third switches (29, 30) are diodes conveniently biased and the second switch (33) is a transistor.

17. A commutation grid according to claim 16, characterized in that the diode constituting the first switch (29) is mounted in series with the base of the transistor constituting the second switch (33), via a lead (32) connected to the diode constituting the third switch (30), said diode constituting the third switch being fed by the output of the conversion stage (R).

* * * * *